(12) United States Patent
Dakin et al.

(10) Patent No.: US 8,163,676 B2
(45) Date of Patent: Apr. 24, 2012

(54) EMULSIFIER BLEND

(75) Inventors: Eugene Dakin, Katy, TX (US); Hui Zhang, Sugar Land, TX (US); Bethicia B. Prasek, The Woodlands, TX (US)

(73) Assignee: M-I L.L.C., Houston, TX (US)

( * ) Notice: Subject to any disclaimer, the term of this patent is extended or adjusted under 35 U.S.C. 154(b) by 29 days.

(21) Appl. No.: 12/745,134

(22) PCT Filed: Nov. 21, 2008

(86) PCT No.: PCT/US2008/084364
§ 371 (c)(1),
(2), (4) Date: May 27, 2010

(87) PCT Pub. No.: WO2009/073411
PCT Pub. Date: Jun. 11, 2009

(65) Prior Publication Data
US 2010/0317549 A1    Dec. 16, 2010

Related U.S. Application Data

(60) Provisional application No. 60/991,346, filed on Nov. 30, 2007.

(51) Int. Cl.
*C09K 8/68* (2006.01)
*E21B 43/16* (2006.01)
*B01F 3/08* (2006.01)

(52) U.S. Cl. .......... 507/203; 166/270.1; 166/305.1; 507/240; 507/244; 507/246; 507/261; 507/266; 507/935; 516/9; 516/53; 516/76; 516/903

(58) Field of Classification Search .......... 507/203, 507/240, 244, 246, 261, 266, 935; 166/270.1, 166/305.1; 516/9, 53, 76, 903
See application file for complete search history.

(56) References Cited

U.S. PATENT DOCUMENTS

| 6,423,326 | B1 | 7/2002 | Shapiro |
| 2006/0223714 | A1 | 10/2006 | Svoboda et al. |
| 2007/0111902 | A1 | 5/2007 | Patel |
| 2010/0300967 | A1* | 12/2010 | Dakin et al. ............ 210/634 |

FOREIGN PATENT DOCUMENTS

JP    2006-273855 A    10/2006

OTHER PUBLICATIONS

Office Action issued in corresponding Australian Application No. 2008331576 dated Jun. 24, 2011 (2 pages).
International Search Report from PCT/US2008/084364 dated Jun. 10, 2009 (3 pages).
Written Opinion from PCT/US2008/084364 dated Jun. 10, 2009 (4 pages).
Office Action issued in corresponding Canadian Application No. 2,707,257 dated Oct. 17, 2011 (2 pages).
Office Action issued in corresponding Eurasian Application No. 201000909 dated Nov. 29, 2011 (4 pages).

* cited by examiner

*Primary Examiner* — Timothy J. Kugel
(74) *Attorney, Agent, or Firm* — Osha • Liang LLP

(57) ABSTRACT

An oil-in-water emulsion that includes a brine continuous phase; and an oleaginous discontinuous phase stabilized by an emulsifier blend, the emulsifier blend comprising: an emulsifier having an HLB greater than 11; and an amphoteric chemotrope is disclosed. Emulsifier blends comprising an emulsifier having an HLB greater than 11 and an amphoteric chemotrope and methods of using emulsifier blends are also disclosed.

20 Claims, No Drawings

EMULSIFIER BLEND

BACKGROUND OF INVENTION

1. Field of the Invention

Embodiments disclosed herein relate generally to emulsifiers used in wellbore operations. In particular, embodiments disclosed herein relate generally to the formation of oil-in-water emulsions.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

The selection of the type of drilling fluid to be used in a drilling application involves a careful balance of both the good and bad characteristics of the drilling fluids in the particular application and the type of well to be drilled. The primary benefits of selecting an oil-based drilling fluid, also known as an oil-based mud, include: hole stability, especially in shale formations, formation of a thinner filter cake than the filter cake achieved with a water-based mud, excellent lubrication of the drilling string and downhole tools, and penetration of salt beds without sloughing or enlargement of the hole, as well as other benefits that should be known to one of skill in the art. Despite the many benefits of using oil-based muds, they have some disadvantages, including high initial and operational costs as well as environmental concerns.

Oil-based muds typically contain some water, either from the formulation of the drilling fluid itself, or water may be intentionally added to affect the properties of the drilling fluid or mud. In such water-in-oil type emulsions, also known as invert emulsions, an emulsifier is used to stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of ordinary skill in the art.

Thus, because both oleaginous and non-oleaginous fluids are used in formulating wellbore fluids, there exists a continuing need for developments in emulisifers that may be used to stabilize one fluid as a discontinuous phase within the other type of fluid.

SUMMARY OF INVENTION

In one aspect, embodiments disclosed herein relate to an oil-in-water emulsion that includes a brine continuous phase; and an oleaginous discontinuous phase stabilized by an emulsifier blend, the emulsifier blend comprising: an emulsifier having an HLB greater than 11; and an amphoteric chemotrope.

In another aspect, embodiments disclosed herein relate to an emulsifier blend that includes an emulsifier having an HLB greater than 11; and an amphoteric chemotrope.

In yet another aspect, embodiments disclosed herein relate to method of performing a downhole operation that includes pumping a wellbore fluid comprising an emulsifier blend into a wellbore, the emulsifier blend comprising: an emulsifier having an HLB greater than 11; and an amphoteric chemotrope.

Other aspects and advantages of the invention will be apparent from the following description and the appended claims.

DETAILED DESCRIPTION

In one aspect, embodiments disclosed herein relate to emulsifier blends used in forming oil-in-water emulsions. In particular, embodiments disclosed herein relate to the use of emulsifier blends for forming oil-in-water emulsions when the continuous aqueous phase includes salts therein. Emulsifying fluids may be comprised of several components including an emulsifying agent, an amphoteric chemotrope, and optionally a mutual solvent. The combination of the first two components may allow for stabilization of an emulsion of an oleaginous fluid into a brine.

The term "oil-in-water emulsion" refers to emulsions wherein the continuous phase is an aqueous phase and the discontinuous phase is oil, which is dispersed within the continuous phase. When combining the two immiscible fluids (aqueous and oleaginous) without the use of a stabilizing emulsifier, while it is possible to initially disperse or emulsify one fluid within the other, after a period of time, the discontinuous, dispersed fluid droplets coalesce or flocculate, for example, due to the instability of the formed emulsion. Thus, to stabilize the emulsion, an emulsifier may be used. Whether an emulsion turns into a water-in-oil emulsion or an oil-in-water emulsion depends on the volume fraction of both phases and on the type of emulsifier.

Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. The term "HLB" (Hydrophilic Lipophilic Balance) refers to the ratio of the hydrophilicity of the polar groups of the surface-active molecules to the hydrophobicity of the lipophilic part of the same molecules. Generally, to form an oil-in-water emulsion, an emulsifier (or a mixture of emulsifiers) having a high HLB, such as greater than 11, may be desirable. In a particular embodiment, the HLB value of the emulsifier may range from 11 to 16.

Further, one skilled in the art would appreciate that any emulsifying agent may be used, including nonionic, cationic or anionic emulsifying agents, as long as a hydrophilic/lipophilic balance sufficient to obtain a stable emulsion of oil into water. Examples of emulsifying agents that may produce an oil-in-water emulsion may include alkyl aryl sulfonates, alkyl sulfonates, alkyl phosphates, alkyl aryl sulfates, ethoxylated fatty acids, ethoxylated amines, ethoxylated phenols, polyoxyethylene fatty acids, esters, ethers and combinations thereof. Blends of these materials as well as other emulsifiers may also be used for this application. Suitable ionic emulsifiers may include alkyl aryl sulphonates, an example of which includes dodecylbenzyl sulfonic acid. Another embodiment may use fatty acids such as butyric acid (C4), caproic acid (C6), caprylic acid (C8), capric acid (C10), lauric acid (C12), mysristic acid (C14), palmitic acid (C16), stearic acid (C18), etc, in addition to unsaturated fatty acids such as myristoleic acid (C14), palmitoleic acid (C16), oleic acid (C18), linoleic acid (C18), alpha-linoleic acid (C18), erucic acid (C22), etc, or mixtures thereof. In addition to these fatty acids, the compounds may also have a small degree of substitution/branching or may be sulfonic or phosphonic derivatives thereof.

Other emulsifiers may include for example hydroxylated ethers, such as those produced by the addition reaction between alkanols or alkyl phenols with alkyl oxides. In a particular embodiment, the emulsifying fluid may include at least one of an alkanol ethoxylate and an alkyl phenol alkoxylate. Exemplary alkanol ethoxylated include those based on hydrocarbon chain lengths of 8-18 carbon atoms. In a particular embodiment, the HLB value of the emulsifier may range from 11 to 16 to allow for emulsification of oil in water. Exemplary alkyl phenol ethoxylates may include those with the chemical formula $RC_6H_4(OC_2H_4)_nOH$, where R contain 8-12 carbon atoms and may be branched or unbranched. The desired degree of ethoxylation in either alkanol ethoxylates or alkyl phenol ethoxylates, n, may range from 2 to 15, and may range from 4 to 8 in other embodiments. However, one skilled in the art would appreciate that additional ethoxylation may be possible as well. Further, one skilled in the art would appreciate that selection between an alkanol ethoxylate and alkyl phenol ethoxylate may partly be based on environmental considerations. Commercial examples of hydroxylated ethers suitable for use in the present disclosure include IGEPAL® CO-630, a nonyl phenol ethoxylate, and BIO-SOFT® N1-7 and N91-6, alcohol ethoxylates, all of which are available from Stephan Company (Northfield, Ill.).

Selection among the emulsifying agents may be dependent, for example, on the particular oleaginous fluid to be emulsified (as to the HLB value required to emulsify the fluid), the presence of pH-dependent solutes (and whether solubilization of those solutes is preferable or undesirable). Thus, for example, a non-ionic emulsifier may be particularly desirable when solubilization of solids within fluid is undesirable, such as in the use of the emulsifier in U.S. Patent Application No. 60/991,352, entitled "Methods of Cleaning Wellbores and Analyzing Wellbore Fluids," which is assigned to the present assignee and herein incorporated by reference in its entirety. However, in other embodiments, it may be desirable to solubilize certain salts, such as in cleaning up a filtercake, and thus an ionic emulsifier such as an acidic alkyl aryl sulfonate may be preferable, such as in the use of the emulsifier in U.S. Patent Application Nos. 60/991,362 and 61/088,878, entitled "Breaker Fluids and Methods of Using the Same," which are assigned to the present assignee and herein incorporated by reference in their entirety.

In the presence of an aqueous fluid with a high salt content, such as seawater, conventional emulsifying agents will not stabilize an oleaginous fluid into an aqueous fluid that contains salts therein. The instability of the oil-in-brine emulsion may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregration into the macroscopic form, thus rendering the dispersions metastable. Emulsions are metastable systems for which phase separation of the oil and water phases represents to the most stable thermodynamic state due to the addition of a surfactant to reduce the interfacial energy between oil and water.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. The addition of salts, however, may result in a reduced electrical double layer. As the double layer decreases, and the distance between two oil droplets is reduced, the oil droplets have more chances to collide with each other and coalesce. Thus, the increase of salt concentration in an emulsion system will increase the electrical conductivity and will in turn destabilize emulsions. Other ways in which salts may potentially destabilize an emulsion include reversible flocculation, irreversible flocculation, change in proton concentrations, etc. Thus, when salts are added to an oil-in-water emulsion stabilized by a conventional emulsifier, the salts, aqueous fluid, and oleaginous fluid are separated into three distinct phases.

However, the use of an emulsifier having a high HLB in conjunction with an amphoteric chemotrope may allow for stabilization of the emulsion by formation/stabilization of the double layer(s). As used herein, an amphoteric chemotrope refers to a compound that exhibits dual properties of being amphoteric (a substance that can react as either an acid or a base) and chemotropic (the way in which a substance orients itself in relation to other chemicals). In a particular embodiment, the amphoteric chemotrope may be hydrotropic (the way in which a substance orients itself in relation to water). Use of this class of compounds may allow for the stabilization of an oil-in-brine emulsion that is not otherwise stabilized by a conventional emulsifier. Thus, the amphoteric chemotrope may also be referred to as a co-emulsifier or a brine compatibility agent as a result of its ability to transform an otherwise unstable mixture into a stabilized emulsion.

In a particular embodiment, the amphoteric chemotrope may be a quaternary ammonium compound represented by the formulae below:

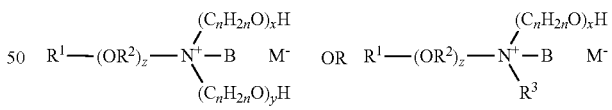

where R1 may be an alkyl or alkenyl group having at least 8 carbons; R2 may be an alkyl group having 2-6 carbon atoms; R3 may be an alkyl group having at least 4 carbons; n may be either 2 or 3; x+y is greater than 5, preferably 5-20; z ranges from 0 to 3; B is hydrogen, an oxyalkyl or alkyl having 1 to 4 carbons, and M is a counter anion, such as a halide. However, one skilled in the art would appreciate that that there may be a balance between the R1/R2 chain and the sum of x+y. That is, if the R1/R2 chain possesses more than 22 carbons, it may be desirable to increase the amount of alkoxylation to greater than 20 so that the compound remains amphiphilic, and vice versa. In particular embodiments, the R1 may be derived from various fatty acids such as butanoic acid (C4), hexanoic acid (C6), octanoic acid (C8), decanoic acid (C10), dodecanoic acid (C12), tetradecanoic acid (C14), hexadecanoic acid (C16), octadecanoic acid (C18), etc.

Further, the counter anions to the quaternaries of the present disclosure may include a variety of counter anions such as the conjugate base to any mineral or strong organic acid, such as halide ion, nitrate ion, sulfate ion, acetate ion, alkyl sulfonate ion, haloalkylsulfonate ions, and the like. Additionally, one skilled in the art would appreciate that additional variations such as substitutions, etc., may exist, so long as they do not alter the nature of the compound to stabilize oil in brine (or to stabilize other chemicals (primary emulsifiers) which stabilize oil in brine).

Examples of suitable amphoteric chemotropes may include quaternary ammonium salts, including quaternary ammonium halides such as chlorides. In a particular embodiment, the amphoteric chemotrope may be an alkoxylated quaternary ammonium chloride (ethoxylated or propoxylated) including quaternary ammonium chlorides derived from fatty amines. Examples of such alkoxylated quaternary ammonium chloride may be isotridecyloxypropyl poly(5) oxyethylene methyl ammonium chloride or coco poly(15) oxyethylene methyl ammonium chloride. Commercial examples of suitable amphoteric chemotrope include Q-17-5 and Q-C-15, which are both ethoxylated quaternary ammonium chlorides, available from Air Products and Chemicals (Allentown, Pa.).

The emulsifying fluid may also optionally contain a mutual solvent, which may aid in blending the emulsifying and amphoteric chemotropes into a wellbore fluid. One skilled in the art would appreciate that by incorporating the agents into the mutual solvent, greater ease in blending the agents in a wellbore fluid may be achieved. However, use of such solvents is optional, and the agents may be incorporated into a wellbore fluid without such solvent.

One example of a suitable mutual solvent may be a glycol ether or glycerol. In a particular embodiment, the mutual solvent is ethylene glycol monobutyl ether (EGMBE). The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Further, in a particular embodiment, selection of a mutual solvent may depend on factors such as the type and amount of salt present in the fluid. For example, in a salt-saturated fluid calcium bromide may have greater compatibility with ethylene glycol monobutyl ether while calcium chloride may have greater compatibility with glycerol. One skilled in the art would appreciate that this difference in compatibility may result from the electronegativity difference between various salts, and the relative ability of the solvent to distribute charges.

The formulation of the fluid may be comprised of (by volume) 25-70 percent of amphoteric chemotrope, 10-40 percent of the emulsifying agent; and 0-40 percent of the mutual solvent. In other embodiments, however, a lower concentration of amphoteric chemotrope and emulsifying agent may be sufficient to form an oil-in-brine emulsion so long as a greater amount of amphoteric chemotrope is used as compared to the emulsifying agent. In a particular embodiment, a ratio of 2:1 to 10:1 of amphoteric chemotrope:emulsifier may be desirable. However, one skilled in the art would appreciate that the amount of amphoteric chemotrope necessary depends on the how incompatible the emulsifier is with brine. For example, if the emulsifier is somewhat incompatible with brine, a ratio of 2:1 to 4:1 of brine compatibility agent:emulsifier may be sufficient, while a less compatible emulsifier may require a ratio of 3:1 to 10:1 brine compatibility agent:emulsifier. Further, depending on the ratios required, it may also be desirable to use a diluent to make the fluid more economical.

One skilled in the art would appreciate that stability of an emulsion may be affected by other factors such as time, temperature, size of the particle and emulsified material. Depending on the requirements of a specific well or desired application, one skilled in the art would appreciate that the emulsifier blend (and wellbore fluid in which the emulsifier blend is added), may be modified to allow for better stabilization. For example, such types of modifications may include emulsion component amounts (concentration and ratio), additional surfactants or other additives, etc.

Formation of the oil-in-water emulsion may be on the surface, or may occur in situ upon injection of the emulsifying fluid downhole. If the emulsifying fluid is used to form an oil-in-water emulsion on the surface, conventional methods can be used to prepare the direct emulsion fluids in a manner analogous to those normally used to prepare emulsified drilling fluids. In particular, various agents may be added to either an oleaginous fluid or brine, with the emulsifier blend being included in either of the two fluids, but preferably the aqueous phase, and then vigorously agitating, mixing, or shearing the oleaginous fluid and the non-oleaginous fluid to form a stable oil-in-water (brine) emulsion. If the oil-in-water emulsion is formed on the surface, one skilled in the art would appreciate that the emulsified fluid may be pumped downhole for use in various operations, including for example, drilling, completion, displacement and/or wash fluid. Alternatively, it is also within the scope of the present disclosure that the emulsifier blend may be pumped downhole for formation of an oil-in-water emulsion downhole. In yet other embodiments, the emulsifier blend may be used to emulsify fluids returned to the surface.

Aqueous fluids that may form the continuous phase of the stabilized oil-in-water emulsion may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid that may form the discontinuous phase of the stabilized oil-in-water emulsion may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous fluid should not be so sufficient that an invert emulsion forms and may be less than about 40% by volume of the emulsion in one embodiment and less than 30% by volume in yet another embodiment. The oleaginous fluid, in one embodiment, may include at least 5% by volume of a material selected from the group including esters, ethers, acetals, dialkylcarbonates, hydrocarbons, and combinations thereof. However, no limitation on the type of oleaginous fluids which may be emulsified is intended by the above list. Rather, the above list includes various oleaginous fluids frequently used in wellbore operations. One of ordinary skill in the art would appreciate that other types of oleaginous fluids may be emulsified in accordance with the present disclosure.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Advantageously, embodiments of the present disclosure for at least one of the following. As direct oil-in-water emulsions may not be stably formed in brine or other salt-containing fluid, the blend of the present disclosure allows for the formation of a stable oil-in-water emulsion, that may be formed on before, during, or after downhole operations, depending on the needs of the operator. Further, formation of a stable emulsion is of particular importance when other conditions require a brine-based and/or solids free heavy fluid or when downhole conditions result in a partial emulsion requiring stabilization.

For example, a wellbore fluid comprising an aqueous (containing salts) continuous phase and an oleaginous discontinuous phase, where the discontinuous phase is stabilized by at least one emulsifier and brine compatibility agent, may be used in drilling. Such stabilized direct emulsion wellbore fluid may advantageously be thermodynamically stable, i.e., it will spontaneously emulsify, whereas current macroemulsions may require mixing. Further, as direct emulsions are transparent, it may be easier to determine when a fluid system is overloaded with particles, due to increased opacity.

Further, when drilling through shale (which are frequently drilling with oil-based fluids), osmotic pressure may be controlled for desired performance. For example, a higher concentration of salt in the drilling fluid would preferentially remove water from shale (causing it to collapse, or shrink), which may make desirable the use of such a fluid in a wellbore in which the pipe has been stuck by active shales, preventing the removal of a bit due to the shale blockage. Conversely, a lower concentration of salt in the drilling fluid may preferentially cause the shale to swell, which may be potentially desirable where fluid loss is occurring and the addition of water can cause the shale to swell, preventing fluid flow and stopping losses. Additionally, the free water concentration of the fluid may be matched with that of the surrounding shale causing neither shrinking nor swelling of shale to maintain a uniform wellbore.

Further, the ability to deliver a solvent or oil in a brine system has large economic potential. The ability to formulate an oil phase stably emulsified in a brine may enable variation in bottom hole pressure to allow overbalanced, balanced or underbalanced drilling, which can be modified at the field level. Further, such fluid system may allow for emulsification of oil in situ in a wellbore to remove the oleaginous fluid or delivery of oleaginous materials for various treatment or other purposes downhole, such as breaking a viscoelastic fluid in the case of an open hole gravel pack spotting fluid.

For filtercake removal, for example, an oleaginous fluid may be selected for desired properties: whether filter cake removal can be sped up, etc. Specifically, surfactant chemistry may be used to preferentially penetrate or remain neutral to a filter cake. When a filter cake is to be removed, penetration surfactant concentrations may be maximized. When a filter cake is required to remain intact to prevent fluid loss, surfactants with little/no penetration ability are added.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. An oil-in-water emulsion, comprising:
    a brine continuous phase; and
    an oleaginous discontinuous phase stabilized by an emulsifier blend, the emulsifier blend comprising:
        an emulsifier having a hydrophilic-lipophilic balance greater than 11; and
        an amphoteric chemotrope.

2. The emulsion of claim 1, wherein the amphoteric chemotrope comprises a quaternary ammonium halide.

3. The emulsion of claim 2, wherein the amphoteric chemotrope comprises an alkoxylated quaternary ammonium chloride.

4. The emulsion of claim 1, where in the emulsifier blend further comprises:
    a mutual solvent.

5. The emulsion of claim 1, wherein the emulsifier comprises at least one of an alkanol ethoxylate or an alkylphenol ethoxylate.

6. The emulsion of claim 1, wherein the emulsifier comprises at least one of an alkyl aryl sulfonic acid, a $C_4$-$C_{22}$ fatty acid, or derivatives thereof.

7. An emulsifier blend, comprising:
    an emulsifier having a hydrophilic-lipophilic balance greater than 11; and
    an amphoteric chemotrope.

8. The blend of claim 7, wherein the amphoteric chemotrope comprises a quaternary ammonium halide.

9. The blend of claim 8, wherein the amphoteric chemotrope comprises an alkoxylated quaternary ammonium chloride.

10. The blend of claim 7, wherein the emulsifier blend further comprises:
    a mutual solvent.

11. The blend of claim 7, wherein the emulsifier comprises at least one of an alkanol ethoxylate or an alkylphenol ethoxylate.

12. The blend of claim 7, wherein the emulsifier comprises at least one of an alkyl aryl sulfonic acid, a $C_4$-$C_{22}$ fatty acid, or derivatives thereof.

13. A method of performing a downhole operation, comprising:
    pumping a wellbore fluid comprising an emulsifier blend into a wellbore, the emulsifier blend comprising:
        an emulsifier having a hydrophilic-lipophilic balance greater than 11; and
        an amphoteric chemotrope.

14. The method of claim 13, wherein the amphoteric chemotrope comprises a quaternary ammonium halide.

15. The method of claim 14, wherein the amphoteric chemotrope comprises an alkoxylated quaternary ammonium chloride.

16. The method of claim 13, wherein the wellbore fluid further comprises:
 a brine continuous phase;
 an oleaginous discontinuous phase stabilized by the emulsifier blend.

17. The method of claim 13, wherein after being pumped into the wellbore, interacting with a brine and an oleaginous fluid to form a stable discontinuous oleaginous fluid phase dispersed in the brine.

18. The method of claim 13, wherein the emulsifier blend further comprises:
 a mutual solvent.

19. The method of claim 13, wherein the emulsifier comprises at least one of an alkanol ethoxylate or an alkylphenol ethoxylate.

20. The method of claim 13, wherein the emulsifier comprises at least one of an alkyl aryl sulfonic acid, a $C_4$-$C_{22}$ fatty acid, or derivatives thereof.

* * * * *